（12） United States Patent
Perona et al.

(10) Patent No.: US 7,280,697 B2
(45) Date of Patent: Oct. 9, 2007

(54) UNSUPERVISED LEARNING OF OBJECT CATEGORIES FROM CLUTTERED IMAGES

(75) Inventors: Pietro Perona, Altadena, CA (US); Markus Weber, Munich (DE); Max Welling, Irvine, CA (US)

(73) Assignee: California Institute of Technology, Pasadena, CA (US)

( * ) Notice: Subject to any disclaimer, the term of this patent is extended or adjusted under 35 U.S.C. 154(b) by 787 days.

(21) Appl. No.: 10/066,318

(22) Filed: Feb. 1, 2002

(65) Prior Publication Data

US 2003/0026483 A1 Feb. 6, 2003

Related U.S. Application Data

(60) Provisional application No. 60/266,014, filed on Feb. 1, 2001.

(51) Int. Cl.
G06K 9/62 (2006.01)
G06K 9/46 (2006.01)
G06K 9/66 (2006.01)

(52) U.S. Cl. .................. 382/225; 382/224; 382/190

(58) Field of Classification Search .......... 382/159, 382/173, 181, 190, 195, 225, 227
See application file for complete search history.

(56) References Cited

U.S. PATENT DOCUMENTS 5,577,135 A * 11/1996 Grajski et al. .............. 382/253
5,774,576 A * 6/1998 Cox et al. .................. 382/160
6,111,983 A * 8/2000 Fenster et al. ............. 382/203
6,633,670 B1 * 10/2003 Matthews .................. 382/176
6,701,016 B1 * 3/2004 Jojic et al. ................. 382/209

OTHER PUBLICATIONS

M.C. Burl, P. Perona, "Recognition of Planar Object Classes," Proceedings of the IEEE Conference on Computer Vision and Pattern Recognition, San Francisco, CA, Jun. 1996, pp. 223-230.*
Castleman, Kenneth, Digital Image Processing, Prentice Hall, Englewood Cliffs, NJ, 1996.*
Basri et al., Clustering Appearances of 3D Objects, Jun. 1998, IEEE, entire document.*

* cited by examiner

Primary Examiner—Bhavesh M Mehta
Assistant Examiner—John B Strege
(74) Attorney, Agent, or Firm—Fish & Richardson P.C.

(57) ABSTRACT

Unsupervised learning of object category from images is carried out by using an automatic image recognition system. A plurality of training images are automatically analyzed using an interest operator which produces an indication of features. Those features are clustered using a vector guantizer. The model is learned from the features using expectation maximization to assess a joint probability of which features are most relevant.

18 Claims, 3 Drawing Sheets

UNSUPERVISED LEARNING OF OBJECT CATEGORIES FROM CLUTTERED IMAGES

CROSS-REFERENCE TO RELATED APPLICATIONS

The present application claims priority from provisional application No. 60/266,014, filed Feb. 1, 2001.

STATEMENT AS TO FEDERALLY-SPONSORED RESEARCH

The U.S. Government has certain rights in this invention pursuant to Grant Nos. NSF9402726 and NSF9457618 awarded by the National Science Foundation.

BACKGROUND

Machines can be used to review an electronic version of an image to recognize information within an electronic image.

An object class is a collection of objects which share characteristic parts or features that are visually similar, and which occur in similar spatial configurations. Solutions to the problem of recognizing members of object classes have taken various forms. Use of various models have been suggested.

These techniques often require a training process that attempts to carry out:
- segmentation, that is which objects are to be recognized and where do they appear in the training images,
- selection, that is, selection of which object parts are distinctive and stable, and
- estimation of model parameters, that is, what parameters of the global geometry or shape and the appearance of the individual parts best describe the training data.

Previous model based techniques may require a supervised stage of learning. For example, targeted objects must be identified in training images either by selection of points or regions on their surfaces, or by segmenting the objects from the background. This may produce significant disadvantages, including that any prejudices of the human observer, such as which features appear most distinctive to the human observer, may also be trained during the training process.

SUMMARY

The present application defines a statistical model in which shape variability is modeled in a probabilistic setting. In an embodiment, a set of images are used to automatically train a system for model learning. The model is formed based on probabilistic techniques.

In an embodiment, an interest operator is used to determine textured regions in the image, and the number of features are reduced by clustering. An automatic model estimates which of these features are the most important and probabilistically determines a model, a correspondence, and a joint model probability density. This may be done using expectation maximization.

BRIEF DESCRIPTION OF THE DRAWINGS

These and other aspects will now be described in detail with reference to the accompanying drawings, wherein.

DETAILED DESCRIPTION

In the present system, instances of an object class are described through characteristic set of features/parts which can occur at varying spatial locations. The objects are composed of parts and shapes. Parts are the image patches that may be detected and characterized by detectors. Shape describes the geometry of the parts. In the embodiment, a joint probability density is based on part appearance and shape models of the object class.

The parts are modeled as rigid patterns. Their positional variability is represented using a probability density function over the point locations of the object features. Translation of the part features are eliminated by describing all feature positions relative to one reference feature. Positions are represented by a Gaussian probability density function.

In one aspect, the system determines whether the image contains only clutter or "background", or whether the image contains an instance of the class or "foreground". According to an embodiment, the object features may be independently detected using different types of feature detectors. After detecting the features, a hypothesis evaluation stage evaluates candidate locations in the image to determine the likelihood of their actually corresponding to an instance of the object class. This is done by fitting a mixture density model to the data. The mixture density model includes a joint Gaussian density over all foreground detector responses, and a uniform density over background responses.

Figure 1:
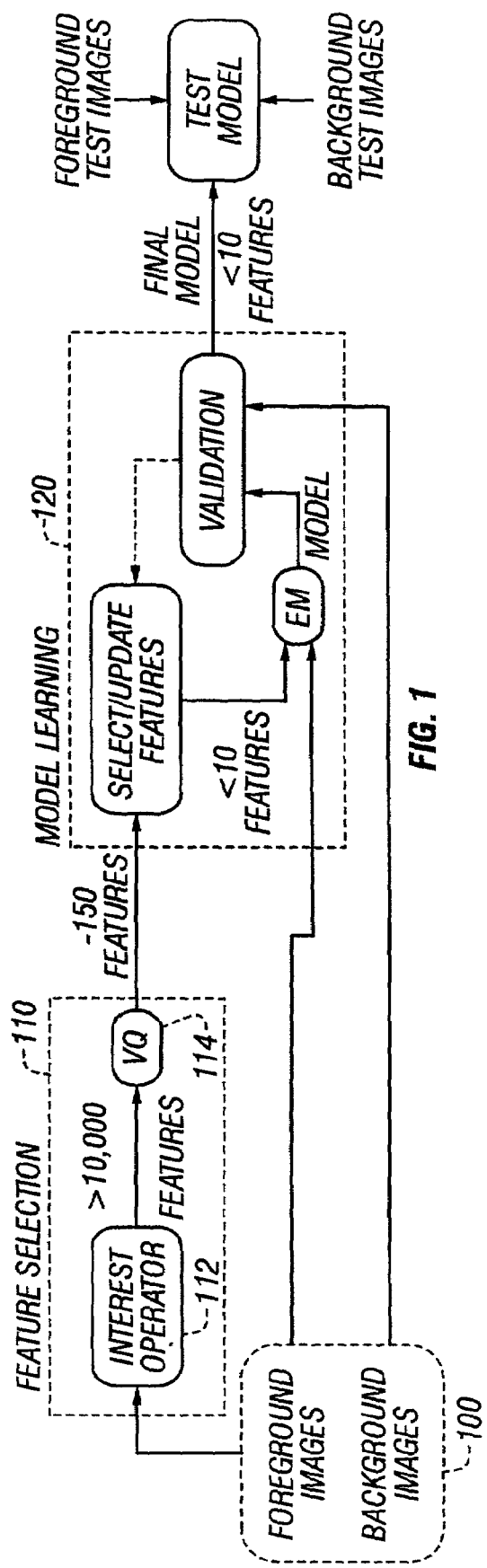
FIG. 1 shows a basic block diagram of the system of the present application.
Figure 4:
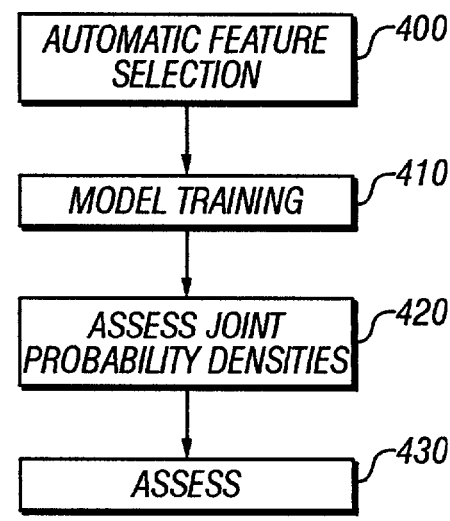
FIG. 4 shows a flowchart of the overall operation.

FIG. 1 shows a basic diagram of the operation and FIG. 4 shows a flowchart of the basic operation. In general, the operation can be carried out on any programmed computer. FIG. 1 may be embodied in a general-purpose computer, as software within the computer, or as any kind of hardware system including dedicated logic, programmable logic, and the like. The images may be obtained from files, or may be obtained using a camera.

Figure 3:
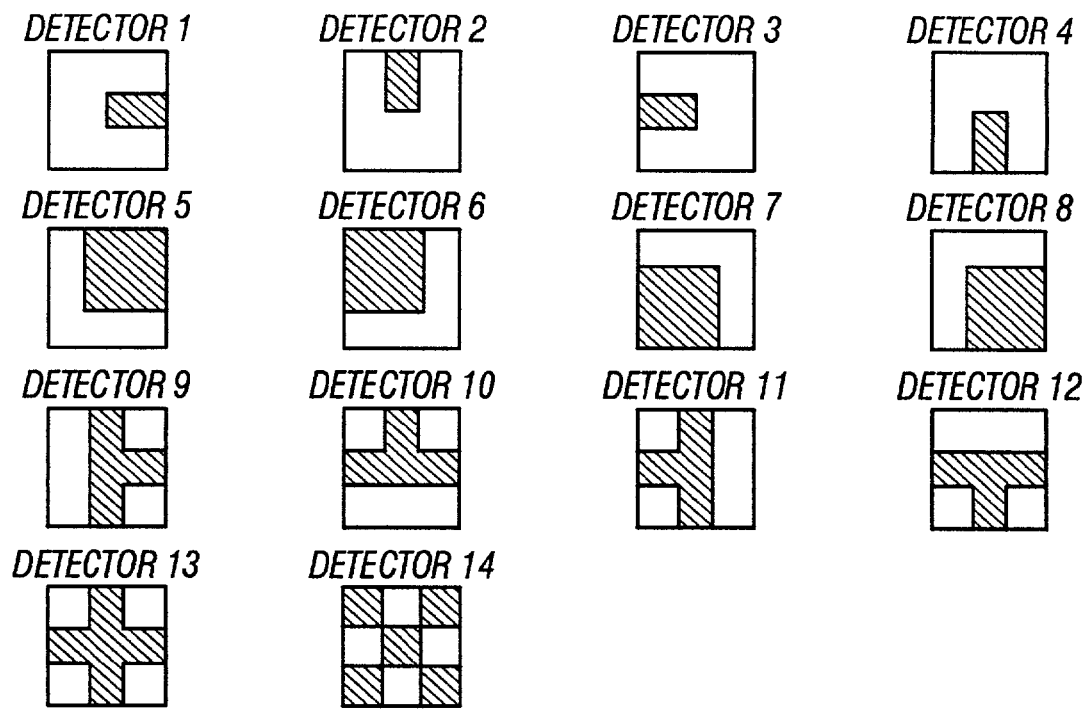
FIG. 3 shows some generic templates.

An image set 100 may be used for automatic feature selection at 400. The image set is applied to a feature selection system 110. The feature selection system 110 may have an interest operator 112 which automatically detects textured regions in the images. The interest operator may be the so called Forstner interest operator. This interest operator may detect corner points, line intersections, center points and the like. FIG. 3 shows a set of 14 generic detector templates which may be used. These templates are normalized such that their mean is equal to zero. Other techniques may be used, however, using other templates.

The automatic feature selection in 400 may produce 10,000 or more features per image.

The number of interesting features is reduced in a vector quantizer 114 which quantizes the vectors and clusters them by grouping similar parts. A clustering algorithm may also be used. This may produce approximately 150 features per image. Shifting by multiple pixels may further reduce the redundancy.

The object model is trained using the part candidates.

Model training at 410 trains the feature detectors using the resultant clusters, in the model learning block 120. This is done to estimate which are of the features are actually the most informative, and to determine the probabilistic description of the constellation that these features form when they are exposed to an object of interest. This is done by forming the model structure, establishing a correspondence between homologous parts across the training set, and labeling and other parts as background or noise.

The inventors recognize three basic issues which may produce advantages over the prior art. First, the technique used for training should be automated, that is, it should avoid segmentation or labeling of the images manually. Second, a large number of feature detectors should be used to enable selecting certain feature detectors that can consistently identify a shared feature of the object class. This means that a subset of the feature detectors may be selected to choose the model configuration. A global shape representation should also be learned autonomously.

Training a model requires determining the key parts of the object, selecting corresponding parts on the number of training images, and estimating the joint probability function based on part appearance and shape. While previous practitioners have done this manually, the present technique may automate this.

Figure 2:
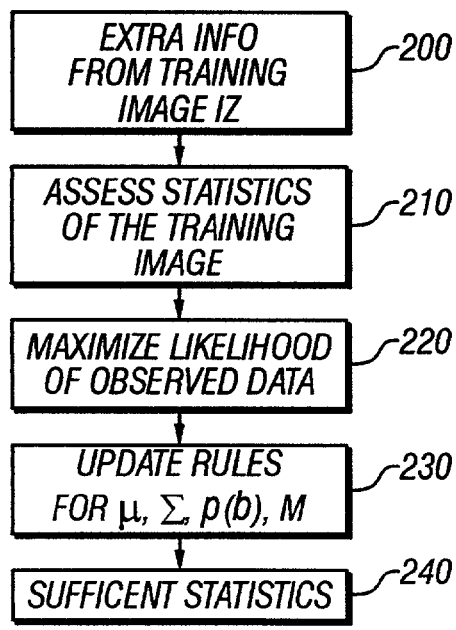
FIG. 2 shows a flowchart of the basic training techniques.

The operation proceeds according to the flowchart of FIG. 2. Initially, a number of feature detectors F. may be selected to be part of the model. At 200, all the information is extracted from the training image. The objects are modeled as collections of rigid parts. Each of those parts is detected by a detector, thereby transforming the entire image into a collection of parts. Some of those parts will correspond to the foreground, that is they will be an instance of the target object class. Other parts stem from background clutter or false detections known as the background.

Assume T different types of parts. Then, the positions of all parts extracted from 1 image may be summarized as a matrix of feature candidate positions of the form:

$$X^0 = \begin{pmatrix} x_{11} x_{12}, \ldots, x_1 N_1 \\ x_{21} x_{22}, \ldots, x_2 N_2 \\ \vdots \\ x_{T1} x_{T2}, \ldots, x_T N_T \end{pmatrix},$$

Each row contains the two-dimensional locations of detections of the feature type F. Random variables of the type $$D = \{X_T^o, x_T^m, n_T, h_T, b_T\}.$$

may be used to represent the explicit or unobserved information. The superscript "o" indicates that the positions are observed, while unobserved features are designated by the superscript "m" for missing.

The entire set x of feature candidates can be divided between candidates which are be true features of the object or the "foreground", and noise features also called the "background". The random variable vector h may be used to create a set of indices so that if $h_i = j; j > 0$, if the point $x_{ij}$ is a foreground point. If an object part is not included in $X^o$ then the corresponding entry in h will be zero.

When presented with an unlabeled image, the system does not know which parts correspond to the foreground. This means that h is not observable. Therefore, h is a hypothesis, since it is used to hypothesize that certain parts of $X^0$ belong to the foreground object. Positions of the occluded or missed foreground features are collected in a separate vector $x^m$, where the size of $x^m$ varies between 0 and F. depending on the number of unobserved features. The binary vector b encodes information about which parts have been detected and which are missed or occluded. Therefore, bf is 1 if hf>0 (the object part is included in $X^o$), and is 0 otherwise.

The vector N denotes the number of background candidates included in a specific row of $X^o$.

Finally, the number $n_{tau}$ represents the number of background detections.

At 210, the statistics of the training image is assessed. The object is to classify the images into the classes of whether the object is present (c1) or whether the object is absent (c0). This may be done by choosing the class with the maximum a posteriori probability. The techniques are disclosed herein. This classification may be characterized by the ratio $$\frac{p(C_1 | X^0)}{p(C_0 | X^0)} \propto \frac{\sum_h p(X^0, h | C_1)}{p(X^0, h_0 | C_0)},$$

The probability distribution modeling the data may be shown as $$p(X^o, x^m, h, n, b) = p(X^o, x^m | h, n) p(h | n, b) p(n) p(b).$$

The probability density over the number of background detection may be modeled by a Poisson distribution as $$p(n) = \prod_{f=1}^{F} \frac{1}{n_f !} (M_f)^{n_f} e^{-M_f},$$

Where $M_f$ is the average number of background detections per image. Allowing a different $M_f$ for each feature allows modeling different detector statistics and ultimately enables distinguishing between more reliable detectors and less reliable detectors.

The vector b encodes information about which features have been detected and which are missed. The probability that b is 1, p(b), is modeled by a table of size $2^F$ which equals the number of possible binary vectors of length F. If F. is large, then the explicit probability mass table of length $2^F$ may become even longer. Independence between the feature detectors and the model p(b) is shown as:

$$p(b) = \prod_{f=1}^{F} p(b_f).$$

The number of parameters reduces in that case from $2^F$ to F.

The density p is modeled by $$p(h | n, b) = \begin{cases} \dfrac{1}{\prod_{f=1}^{F} N_f^{b_f}} & h \in H_b \\ 0 & \text{other } h \end{cases}$$

where Hb denotes the set of all hypotheses consistent with both b and n and $N_f$ and denotes the total number of detections of the feature f.

The hypothesized foreground detections are shown as $$p(X^o, x^m | h, n) = G(z | \mu, \Sigma) U(x_{bg})_1$$

Where $z^T \equiv (x^o x^m)$ is defined as the coordinates of the hypothesized foreground detections both observed and missing, $x_{bg}$ is defined as the coordinates of the background detection, $G(z | \mu, \Sigma)$ denotes a Gaussian with a mean of $\mu$ and covariance of $\Sigma$.

The positions of the background detections are modified with a uniform intensity shown by $$U(x_{bg}) = \prod_{f=1}^{F} \frac{1}{A^{n_f}},$$

Where A is the area covered by the image.

Statistical learning is then used to estimate parameters of the statistical object class. This may be done using expectation maximization. The joint model probability density is estimated from the training set at 420. A probabilistic attempt is carried out to maximize the likelihood of the observed data, using expectation maximization (EM) to attempt to determine the maximum likelihood solution.

$$L(X^0 | \bar{\theta}) = \sum_{\tau=1}^{T} \log \sum_{h_\tau} \sum_{b_\tau} \sum_{n_\tau} \int p(X_\tau^0, x_\tau^m, h_\tau, n_\tau, b_\tau | \theta) dx_\tau^m,$$

Where θ represents the set of all parameters of the model. This may be simplified as $$Q(\bar{\theta} | \theta) = \sum_{\tau=1}^{T} E[\log p(X_\tau^0, x_\tau^m, h_\tau, n_\tau, b_\tau | \bar{\theta})].$$

Where E[.] denotes taking the expectation with respect to $p(h_T, x_T^m, n_T, b_T | X_T^0, \theta)$. As notation, the tilde implies that the values from a previous iteration are substituted. By using the EM technique, a local maximum may be found to thereby determine the maximum values.

At 130, update rules are determined. This may be done by decomposing Q into four parts:

$$Q(\bar{\theta} | \theta) = Q_1(\bar{\theta} | \theta) + Q_2(\bar{\theta} | \theta) + Q_3(\bar{\theta} | \theta) + Q_4(\theta)$$

$$= \sum_{\tau=1}^{T} E[\log p(n_\tau | \theta)] + \sum_{\tau=1}^{T} E[\log p(b_\tau | \theta)] +$$

$$\sum_{\tau=1}^{T} E[\log p(X_\tau^0, x_\tau^m | h_\tau, n_\tau, \theta)] +$$

$$\sum_{\tau=1}^{T} E[\log p(h_\tau | n_\tau, b_\tau)]$$

The first three terms contain the parameters that will be updated while the last term includes no new parameters. First, the update rules for μ. Q3 depends only on μ tilde. Therefore, taking the derivative of the expected likelihood yields $$\frac{\partial}{\partial \bar{\mu}} Q_3(\bar{\theta} | \theta) = \sum_{\tau=1}^{T} E\left[\sum\nolimits^{-1} (z_\tau - \bar{\mu})\right],$$

Where $z^T = (x^0 \ x^m)$ according to the definition above. Setting the derivative to 0 yields the update rule $$\bar{\mu} = \frac{1}{T} \sum_{\tau=1}^{T} E[z_T].$$

Next the update rule for Σ operates in an analogous way. The derivative with respect to the covariance matrix $$\frac{\partial}{\partial \bar{\Sigma}^{-1}} Q_3(\bar{\theta} | \theta) = \sum_{\tau=1}^{T} E\left[\frac{1}{2}\sum\nolimits - \frac{1}{2}(z_\tau - \bar{\mu})(z_\tau - \bar{\mu})^T\right].$$

Equating with zero leads to $$\sum = \frac{1}{T} \sum_{\tau=1}^{T} E[(z_\tau - \bar{\mu})(z_\tau - \bar{\mu})^T] = \frac{1}{T} \sum_{\tau=1}^{T} E[z_\tau z_\tau^T] - \bar{\mu}\bar{\mu}^T.$$

The update rule for p(b) may require considering $Q_2$ since this is the only term the depends on the parameters. The derivative with respect to p(b) yields $$\frac{\partial}{\partial \bar{p}(\bar{b})} Q_2(\bar{\theta} | \theta) = \sum_{\tau=1}^{T} \frac{E[\delta_{b,\bar{b}}]}{\bar{p}(\bar{b})}$$

And imposing the constraint $$\Sigma_{\bar{b} \in B} \bar{p}(\bar{b}) = 1,$$

E.g. by adding a Lagrange multiplier term provides $$\bar{p}(\bar{b}) = \frac{1}{T} \sum_{\tau=1}^{T} E[\delta_{b,\bar{b}}].$$

The update rule for M only depends on Q3, and hence differentiating this with respect to M yields $$\frac{\partial}{\partial \bar{M}} Q_3(\bar{\theta} | \theta) = \sum_{\tau=1}^{T} \frac{E[n_\tau]}{\bar{M}} - 1.$$

Equating to zero gives the intuitive result, $$\bar{M} = \frac{1}{T} \sum_{\tau=1}^{T} E[n_\tau].$$

At 140 the sufficient statistics are determined. The posterior density is given by $$p(h_\tau, x_\tau^m, n_\tau, b_\tau | X_\tau^0, \theta) =$$

-continued $$\frac{p(h_\tau, x_\tau^m, n_\tau, b_\tau, X_\tau^0 \mid \theta)}{\sum_{b_\tau \in H_b} \sum_{b_\tau \in B} \sum_{n_\tau=0}^{\infty} \int p(h_\tau, x_\tau^m, n_\tau, b_\tau, X_\tau^0 \mid \theta) dx_\tau^m}$$

Which may be simplified by noticing that if the summations are carried out in the order $$\sum_{b_\tau \in H_b} \sum_{b_\tau \in B} \sum_{n_\tau=0}^{\infty}$$

Then certain simplifications may be made.

This enables selecting a hypothesis that is consistent with the observed data.

A final operation assesses the performance of the model at 430.

After applying all the feature detectors to the training samples, a greedy configuration search may be used to explore different model configurations. In general, configurations with a few different features may be explored. The configuration which yields the smallest training error, that is the smallest probability of misclassification, may be selected. This may be also augmented by one feature trying again all possible types. The best of these augmented models may be retained for subsequent augmentation. The process can be continued until a criterion for model complexity is met. For example, if no further improvement in detection performance is obtained before the maximum number of features is reached, then further operations should be unnecessary.

An iterative process may start with a random selection of parts. At each iteration, a test is made to determine whether replacing one model part with a randomly selected part improves or worsens the model. The replacement part is capped when the performance improves, otherwise the process is stopped when no more improvements are possible. This can be done after increasing the total number of parts to the model to determine if additional parts should be added. This may be done by iteratively trying different combinations of small numbers of parts. Each iteration allows the parameters of the underlying probable listed model to be estimated. The iteration continues until the final model is obtained.

Figure 5A:
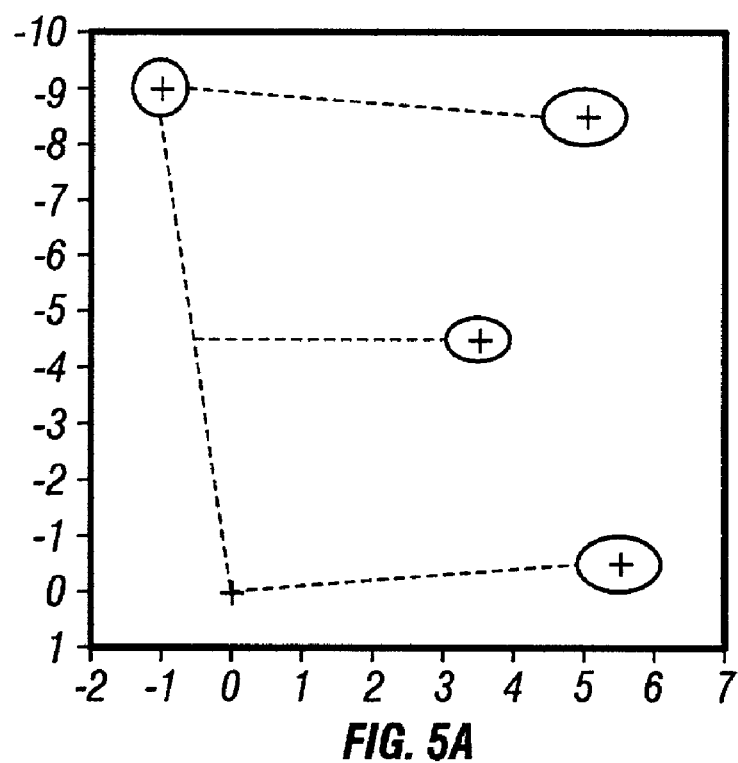
FIGS. 5A and 5B shows some exemplary results for models for specified letters.
Figure 5B:
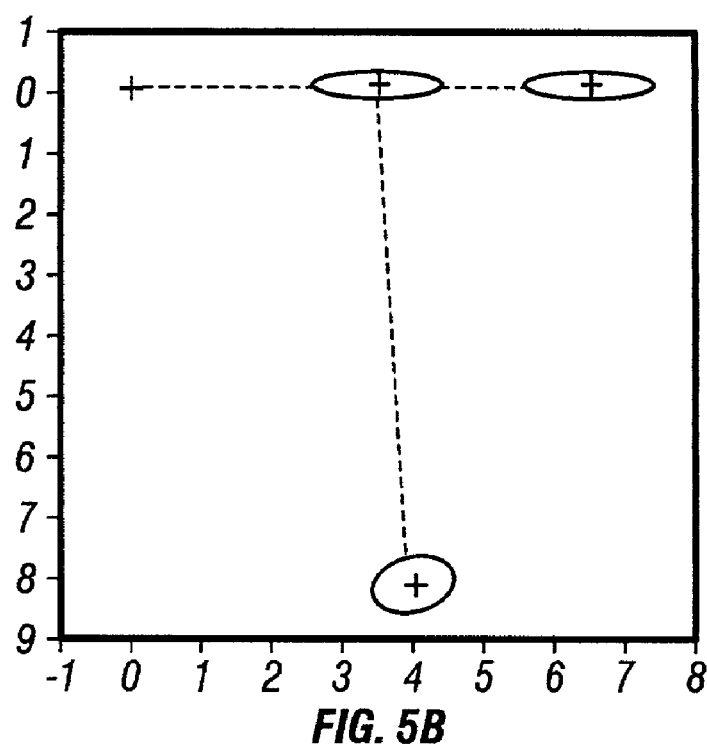

As an example, a recognition experiment may be carried out on comic strips. In an embodiment, the system attempted to learn the letters E, T, H and L. Two of the learned models are shown in FIGS. 5A and 5B which respectively represent the model for the letter B and the model for the letter T.

The above has described the model configuration being selected prior to the EM phase. However, this could conceivably require a model to be fit to each possible model configuration. This may be avoided by producing a more generic model.

This system has been used to identify handwritten letters e.g. among comic books, recognition of faces within images, representing the rear views of cars, letters, leaves and others.

This system may be used for a number of different applications. In a first application, the images may be indexed into image databases. Images may be classified automatically enabling a user to search images that include given objects. For example, a user could show this system can image that includes a frog, and obtain back from at all images that included frogs.

Autonomous agents/vehicle/robots could be used. For example, this system could allow a robot to Rome and area and learn all the objects were certain objects are president. The vehicle could then report events that differ from the normal background or find certain things.

This system could be used for automated quality control, for example, this system could be shown a number of defective items, and find similar defective items. Similarly, the system could be used to train for dangerous situations.

Another application is in toys and entertainments e.g. a robotic device. Finally, visual screening in industries such as the biomedical industry in which quality control applications might be used.

Although only a few embodiments have been disclosed in detail above, other modifications are possible. All such modifications are intended to be encompassed within the following claims, in which:

What is claimed is:

1. A method, comprising:
   analyzing a plurality of images and automatically selecting a plurality of selected features in said plurality of images;
   reducing a number of said features by vector quantizing said automatically-detected features, and clustering among the vector-quantized features, wherein said clustering also includes moving said features to combine similar features which are spatially offset, said reducing forming a set of reduced features;
   automatically determining which of said reduced features will be used for a model, by classifying the image with a specific feature included and reclassifying the image without the feature included to form probabilities indicating whether the feature should be included and including features with higher probabilities in a model training feature set;
   automatically training a model for further recognition of said specified feature, using said model feature set; and
   using only those similar features to form a model.

2. A method as in claim 1, wherein said automatically determining a model comprises probabilistically estimating which of the features are most informative for the model.

3. A method as in claim 2, wherein said automatically determining comprises assessing a joint probability function.

4. A method as in claim 3, wherein said joint probability function is estimated using expectation maximization.

5. A method as in claim 1, further comprising forming a model using a plurality of recognized parts.

6. A method, comprising:
   automatically analyzing an image to find features therein;
   grouping said features with other similar features to form clustered features;
   statistically analyzing said features using expectation maximization, to determine which of said clustered features are statistically most relevant, by classifying the image with a specific feature included and reclassifying the image without the specific feature included to form probabilities indicating the statistically most relevant features;
   forming a model using the statistically most relevant features;
   wherein said grouping features comprises vector quantizing said features and grouping similar quantized features; and wherein said grouping features further comprises spatially moving said features to group features which are different but spatially separated.

7. A method as in claim 6, wherein said automatically analyzing comprises using an interest operator on a plurality of images.

8. A method, comprising:
automatically analyzing an image to find features therein;
grouping said features with other similar features to form clustered features;
statistically analyzing said clustered features using expectation maximization, to determine which of said clustered features are statistically most relevant, by automatically determining which of said clustered features will be used for a model, by classifying the image with a specific feature included and reclassifying the image without the feature included to form probabilities indicating whether the feature should be included as statistically most relevant features; and
forming a model using the statistically most relevant features;
wherein said grouping features further comprises spatially moving said features to group features which are different but spatially separated; and
wherein said statistically analyzing comprises establishing a correspondence between homologous parts across the training set of images; and
ignoring other features that are not in said set of homologous parts.

9. An article comprising:
a machine-readable medium which stores machine-executable instructions, the instructions causing a machine to:
automatically analyze a plurality of training images which includes a specified desired feature therein, to select a plurality of selected features;
establish correspondence between homologous parts among said plurality of desired features in the plurality of training images to form a set of homologous parts;
automatically determine which of said homologous parts will be used for a model, by classifying the image with a specific feature included and reclassifying the image without the feature included, to form probabilities indicating whether the feature should be included and including features with higher probabilities; and
automatically form a model for further recognition of said features with higher probabilities.

10. An article as in claim 9, further comprising instructions to vector quantize said features to reduce the total number of detected features.

11. An article as in claim 9, wherein said automatically determining a model further comprising instructions to probabilistically estimate which of the features are most informative for the model.

12. An article as in claim 9, further comprising instructions to assemble a matrix of feature candidate positions indicating possible relevant parts, and statistically assess whether said relevant parts are likely to be useful.

13. A method as in claim 3, wherein said joint probability function is estimated using expectation maximization.

14. An article as in claim 9, further comprising instructions to form a model using a plurality of recognized parts.

15. An apparatus, comprising:
a computer, forming:
a plurality of feature detectors, reviewing images to detect parts in the images, some of those parts will correspond to the foreground as an instance of a target object class, and other parts not being an instance of the target object class, as part of the background;
a hypothesis evaluation part, that evaluates candidate locations identified by said plurality of feature detectors, to determine the likelihood of a feature corresponding to an instance of said target object class;
wherein said evaluation part operates by:
defining the parts as part of a matrix; and
assigning variables representing likelihood whether the parts in the matrix are from a foreground part or a background part by automatically determining which of said reduced features will be used for a model, classifying the image with a specific feature included and reshaping the image without the feature included to form probabilities indicating whether the feature should be included and including features with higher probabilities as foreground parts, and a model forming part, forming a model based on only said foreground parts.

16. An apparatus as in claim 15, further comprising:
classifying the images into the classes of whether the object is present (c1) or whether the object is absent (c0) by choosing the class with a maximum a posteriori probability.

17. A method comprising:
reviewing images to detect specified parts in the images;
assigning a variable that defines some of those parts corresponding to the foreground as an instance of a target object class, and other parts not being an instance of the target object class, as part of the background, said assigning including evaluating candidate locations identified by a plurality of feature detectors, to determine the likelihood of a feature corresponding to an instance of said target object class;
wherein said assigning comprises:
defining the parts as part of a matrix; and
assigning variables representing likelihood whether the parts in the matrix are from a foreground part or a background part by automatically determining which of said reduced features will be used for a model, by classifying the image with a specific feature included and reclassifying the image without the feature included to form probabilities indicating whether the feature should be included and including features with higher probabilities as foreground parts, and a model forming part, forming a model based on only said foreground parts.

18. A method as in claim 17, wherein said assigning comprises:
classifying the images into the classes of whether the object is present or whether the object is absent by choosing the class with a maximum a posteriori probability.

* * * * *